(12) United States Patent
Cornali (10) Patent No.: US 8,812,546 B1
(45) Date of Patent: *Aug. 19, 2014

(54) STATE MANAGEMENT FOR USER INTERFACES

(75) Inventor: Del J. Cornali, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 13/558,087

(22) Filed: Jul. 25, 2012

Related U.S. Application Data (63) Continuation of application No. 13/210,266, filed on Aug. 15, 2011, now Pat. No. 8,244,758, which is a continuation of application No. 12/118,436, filed on May 9, 2008, now Pat. No. 8,001,145.

(51) Int. Cl.
*G06F 7/00* (2006.01)
*G06F 17/30* (2006.01)

(52) U.S. Cl.
USPC ............ 707/779; 707/798; 707/805; 707/807

(58) Field of Classification Search
CPC ............ G06F 9/4446; G06F 17/30873; G06F 17/30997; G06Q 30/02; G06Q 30/0259; G06Q 30/0269; H04N 21/25883
USPC ........................................................ 707/779
See application file for complete search history.

(56) References Cited

U.S. PATENT DOCUMENTS

| | | | |
|---|---|---|---|
| 6,741,855 B1* | 5/2004 | Martin et al. | 455/419 |
| 6,768,997 B2* | 7/2004 | Schirmer et al. | 707/779 |
| 7,065,525 B1* | 6/2006 | Sasaki et al. | 369/13.01 |
| 2003/0043187 A1* | 3/2003 | Li | 345/749 |
| 2003/0105589 A1* | 6/2003 | Liu et al. | 702/1 |
| 2004/0054589 A1* | 3/2004 | Nicholas et al. | 705/14 |
| 2007/0033595 A1* | 2/2007 | Carr et al. | 719/328 |
| 2007/0239468 A1* | 10/2007 | O'Brien et al. | 705/1 |
| 2008/0001751 A1* | 1/2008 | Gieseke et al. | 340/572.1 |
| 2008/0108035 A1* | 5/2008 | Warda | 434/335 |
| 2008/0140680 A1 | 6/2008 | Hyder et al. | |
| 2008/0162305 A1* | 7/2008 | Rousso et al. | 705/27 |
| 2008/0181123 A1* | 7/2008 | Huang et al. | 370/252 |
| 2009/0259950 A1* | 10/2009 | Sullivan et al. | 715/762 |
| 2010/0063971 A1* | 3/2010 | Cragun et al. | 707/741 |
| 2010/0063975 A1* | 3/2010 | Hayes | 707/765 |

* cited by examiner

*Primary Examiner* — Binh V Ho
(74) *Attorney, Agent, or Firm* — Kilpatrick Townsend & Stockton, LLP (57) ABSTRACT

State information for a page can be stored and restored using a component state manager to extract and set state information for various components on a page. Each appropriate component can register with the state manager, such that when a user requests to store state information, the state manager can extract state information for each registered component and store the state information accordingly. The user can be provided with a tag or other identifier that allows the user to subsequently request recreation of that state. In response to receiving the identifier, the state manager retrieves the stored state information and sets the state of each respective registered component on the page. The identifiers can be shared with other users to allow those users to also quickly access the same state.

20 Claims, 6 Drawing Sheets

```xml
<userMetaData forUser="JohnDoeDoc">
<filterSettings for="OrganizationalFilter">
<setting name="4" value="ok" />
<setting name="1" value="ok" />
</filterSettings>
<filterSettings for="PropteryFilter">
<setting name="Select filter by version" value="item1" />
</filterSettings>
<filterSettings for="productTypeSelectionsFilter">
<setting name="KIMONO" value="selected" />
<setting name="OBI" value="selected" />
<setting name="SOCKSHOSIERY" value="selected" />
<setting name="SKIRT" value="selected" />
<setting name="NONAPPARELMISC" value="selected" />
<setting name="SUIT" value="selected" />
<setting name="APPAREL" value="selected" />
<setting name="SLEEPWEAR" value="selected" />
<setting name="UNDERWEAR" value="selected" />
<setting name="POWERSPORTS_RIDING_GLOVES" value="selected" />
<setting name="POWERSPORTS_RIDING_SUIT" value="selected" />
<setting name="SWEATER" value="selected" />
<setting name="DRESS" value="selected" />
<setting name="CHANCHANKO" value="selected" />
<setting name="SWIMWEAR" value="selected" />
<setting name="HOMEACCESSORY" value="selected" />
<setting name="BRA" value="selected" />
<setting name="JINBEI" value="selected" />
<setting name="POWERSPORTS_RIDING_SHIRT" value="selected" />
<setting name="PROTECTIVE_GEAR" value="selected" />
<setting name="POWERSPORTS_RIDING_JACKET" value="selected" />
<setting name="POWERSPORTS_RIDING_PANTS" value="selected" />
<setting name="SHORTS" value="selected" />
<setting name="YUKATA" value="selected" />
<setting name="PANTS" value="selected" />
<setting name="HAT" value="selected" />
<setting name="BLAZER" value="selected" />
<setting name="POWERSPORTS_PROTECTIVE_GEAR" value="selected" />
<setting name="ACCESSORY" value="selected" />
<setting name="POWERSPORTS_RIDING_HELMET" value="selected" />
<setting name="BAG" value="selected" />
<setting name="POWERSPORTS_RIDING_APPAREL" value="selected" />
<setting name="PERSONALBODYCARE" value="selected" />
<setting name="OUTERWEAR" value="selected" />
<setting name="SHIRT" value="selected" />
<setting name="POWERSPORTS_RIDING_UNDERWEAR" value="selected" />
</filterSettings>
</userMetaData>
```

STATE MANAGEMENT FOR USER INTERFACES

CROSS-REFERENCES TO RELATED APPLICATIONS

This application is a continuation of U.S. patent application Ser. No. 13/210,266, filed Aug. 15, 2011, titled "STATE MANAGEMENT FOR USER INTERFACES", which application is a continuation of U.S. application Ser. No. 12/118,435, filed May 9, 2008, titled "STATE MANAGEMENT FOR USER INTERFACES" the full disclosures of which are incorporated herein by reference.

BACKGROUND

The present disclosure relates generally to, among other things, the generation, maintenance, and use of data, metadata, and/or various data structures. As the amount of such information stored electronically continues to increase dramatically, approaches for managing this increasing amount of data become evermore important. Data typically is stored in a data storage using a two-dimensional approach, with each item of data corresponding to a row in at least one table that includes entries in respective columns of information. The mapping or other linking between tables provides the ability for the data to be linked to various other data, organizations, classifications, etc. The linking of various tables at different levels can thus produce a hierarchy of information relating to each stored data item. In order to attempt to provide some context for the data, metadata is often stored that provides additional information for each stored data item. For example, metadata might be used to associate a data item with one or more categories of data, as well as to provide information about those categories.

As the size of these hierarchies and the amount of data increases, the ability to manage the data and even locate specific data becomes more difficult. Further, as categories and other information can change over time, it becomes increasingly difficult to manage and update all the appropriate stored information. Not only is it time consuming to locate the information, but it can be difficult to get back to that information at a later time without having to again go through the lengthy navigation process. Also, there is no way to easily share the location of that data without having to instruct another user as to how to locate the data, which then requires that user to also endure the navigation process. Various other aspects of these approaches are time consuming or inefficient, or come with various other deficiencies.

BRIEF DESCRIPTION OF THE DRAWINGS

Various embodiments in accordance with the present disclosure will be described with reference to the drawings, in which:

FIG. 6 illustrates an extensible markup language (XML) document including state information for a number of registered components that can be used in accordance with one embodiment.

DETAILED DESCRIPTION

Systems and methods in accordance with various embodiments of the present disclosure may overcome one or more of the aforementioned and other deficiencies experienced in conventional approaches to managing information in an electronic environment. The information can include, or relate to, any appropriate content desired to be stored electronically. As used herein, the term "content" can refer to anything that can be displayed, stored, manipulated, reported on, analyzed, or otherwise conveyed to a user, such as through a graphical user interface (GUI), typically in response to a request from the user. A request for content can include any appropriate request sent over an appropriate system or network, such as a request sent to an Enterprise server over a local area network (LAN), a request submitted via a Web page over the Internet, or a message sent via a messaging system to a content provider, for example.

Figure 1:
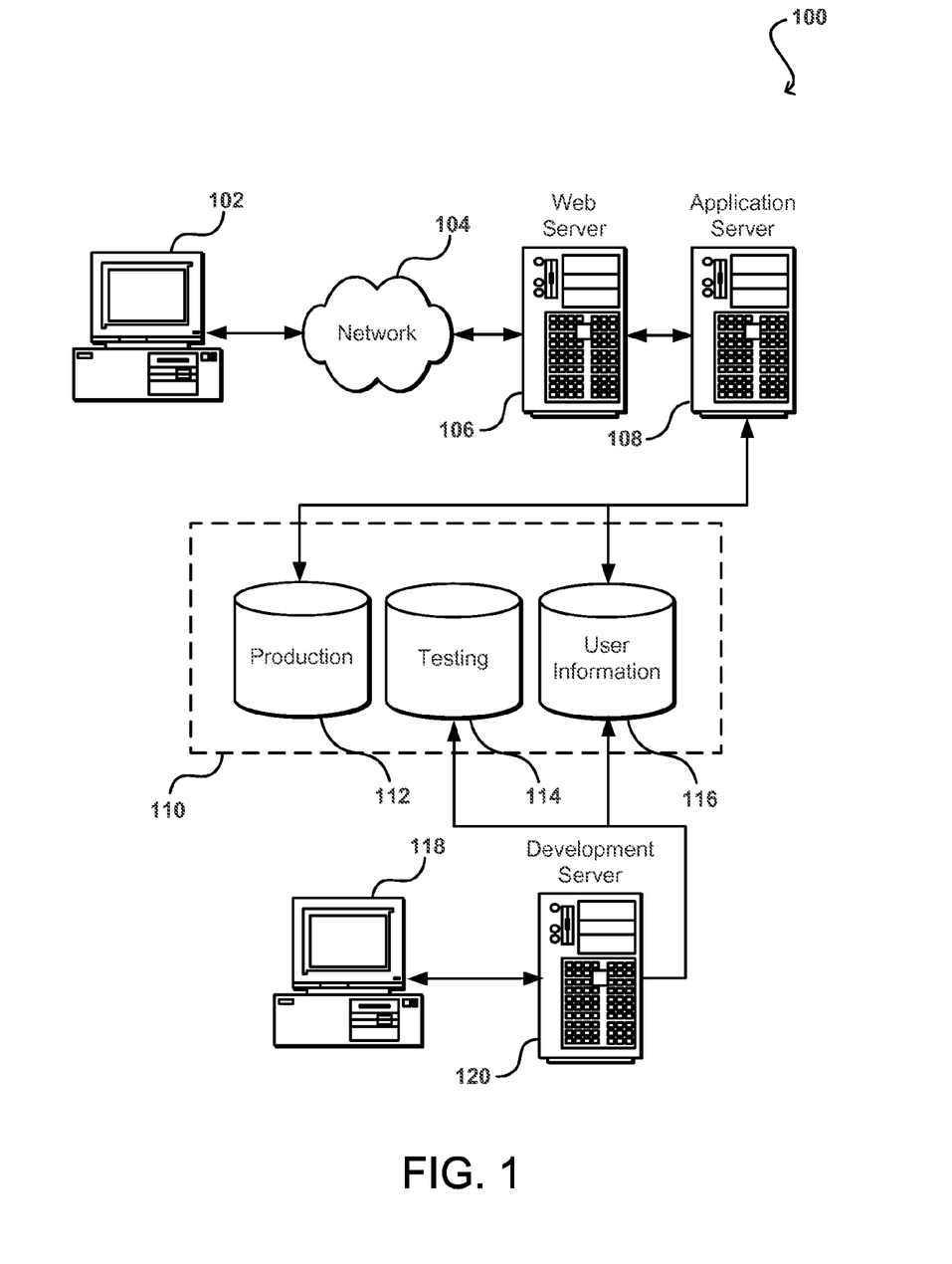
FIG. 1 illustrates a system configuration that can be used in accordance with one embodiment.

FIG. 1 illustrates an example of an environment 100 for implementing aspects in accordance with various embodiments. As will be appreciated, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML for at least one Web page using hypertext transfer protocols. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Aspects of the various embodiments can be utilized on the production side or the development side. These aspects also can be used in other environments, where there may not be such a separation, or where there may be other portions such as a dedicated test server (not shown) or other such devices. Arrangements for testing development and production code are known in the art and will not be discussed herein in detail.

Figure 2:
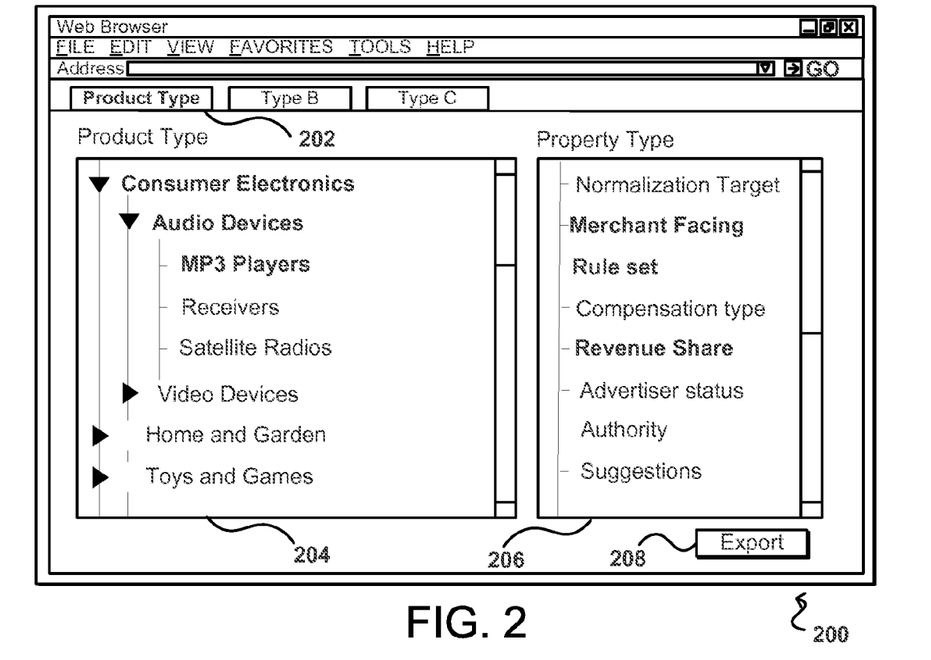
FIG. 2 illustrates a page showing product type information that can be used in accordance with one embodiment.

FIG. 2 illustrates an example of a graphical user interface (GUI) window 200, in this example programmed to be displayed via a browser application on a client device, displaying a Web page in which a user is able to view data, metadata, and product information for content in an electronic marketplace application. While an electronic marketplace is used for purposes of explanation, it should be understood that this is merely an example and that any electronic environment where information is stored, retrieved, and managed can take advantage of aspects of various embodiments described and suggested herein. For example, an Enterprise system could store information relating to employees, salaries, benefits, etc.

In the example of FIG. 2, a user is able to first select a type of information to view, such as by selecting a type filter tab 202 or other appropriate user-selectable object. Once a type of information is selected, additional navigational elements are presented to the user, which allow the user to navigate to, and/or select, the desired information. Here, the user is presented with a hierarchical list 204 of product types (per selection of the product type tab) that allows the user to navigate through the list to obtain the desired product type. Once the user locates and selects the desired product type, the user can be presented with another list 206 of property types for the selected product type. The property types in one embodiment correspond to metadata about the selected product type data. The list of property types can allow a user to select one or more property types to be viewed, analyzed, extracted, or otherwise processed. In some embodiments, the property type list also can be hierarchical. As can be seen in this example, the user selected the product type tab 202, navigated through the hierarchical product type list 204 to select information for MP3 players, and selected at least three property types from the property type list 206. At this point, the user can select an export 208 or other appropriate option to perform the desired action for the selected data. Other techniques, options, or directions for navigating content on a page can be used as well. Further, in order to access the information, a user can be identified to the system using any appropriate approach known in the art, such as by having the user login to the site, or by storing a cookie for the user's browser.

One such metadata editor utilizes Java Server Faces (JSF) available from Sun Microsystems, Inc. of Santa Clara, Calif., to implement a Model View Controller MVC)-based approach to managing metadata and related information. An MVC-based approach includes an abstract data model that includes a hierarchy of the data and the relationships therebetween, which can be implemented using a series of Java modules. An MVC-based approach also includes a view portion that determines which information the user is allowed to see and how the user is able to interact with that information, and includes the actual user interface. The model and view are kept separate within the MVC environment, with the interaction of these components being determined by the controller portion. An advantage of implementing MVC using a technology such as JSF (a potent building block of Web 2.0 interfaces) is that a technology such as JSF is able to leverage the power and ease of existing data systems and data services using standard GUI elements such as Ajax elements. Further, conventional approaches relied upon state variables to define a current user's state within the application, including, for example, URL ("GET") variables, session variables, and database values. Using JSF, however, allows an application to be "state aware," as the backing Java beans are able to maintain and track user state. Such an approach allows a user to stay on a single page of an application or Web site, but engage in multiple user transactions thus making the application or site appear more like a traditional desktop application than a traditional web page.

As discussed above, however, such an approach can have various disadvantages, as the process for locating and selecting the correct data in the hierarchies can be lengthy and difficult, particularly for those users who are only familiar with data for a portion of the available information. If a user wishes to subsequently access the same types of information, the user goes through the entire navigational process again. While this might not be as difficult for the same user a second or third time around, the difficulty for a different user trying to access that same data will not be improved. Further, even for users who know how to navigate to the desired data, the process still can take an unacceptable amount of time, particularly when a user frequently navigates to the same data. For example, a metadata editor for a provider of an electronic marketplace might be used by various users, each of which is responsible for metadata for a particular category of product information. The metadata editor, which in one example takes the form of a thin GUI wrapper around a database that pertains to item metadata, can present the information using very large lists, some of which can be hierarchical whereby it is beneficial that a user be at least somewhat familiar with the tree structure in order to know which nodes contain the desired information. A user responsible for a product type might have to periodically locate the appropriate metadata for a product type to determine information about that product, such as how the product is being used or processed. At least one user also can be tasked with managing the entire knowledge base of metadata. The inability to quickly navigate back to a desired state thus can be problematic from a cost and efficiency standpoint.

For example, a category manager might use a company-wide back-end JSF-application. The manager might spend the first several minutes interacting with the application just "setting up" the application, or pre-selecting the elements which pertain just to the respective area(s) of expertise. Since standard uniform resource locator (URL)-based approaches using GET statements are not secure, and can be easily hacked to gain unauthorized access to the data, a JSF-based editor is used that does not utilize links or URLs with embedded GET statements. Unfortunately, the lack of usable GET variables means that the category manager has no way to preset the application to the manager's preferences. Without any way to save or restore the state of their interaction with an application, the manager is forced to re-do the same time-consuming repetitive steps simply to get to a starting point in the application to perform their daily work activities.

Accordingly, systems and methods in accordance with one embodiment enable applications, modules, programs, sites, and other such functionality to store and restore state information, such as user interaction through a user interface (UI). Such an approach can still take advantage of technologies such as JSF and Ajax, which allow users to interact with a variety of components including components providing for single-selections, multi-selections (e.g., flat drop-down lists and tree-type hierarchies), and complex key-value properties. A user is able to navigate to any particular state using the components of the UI, and is able to save the state information to be subsequently retrieved to regenerate that state of the UI components.

Figure 3:
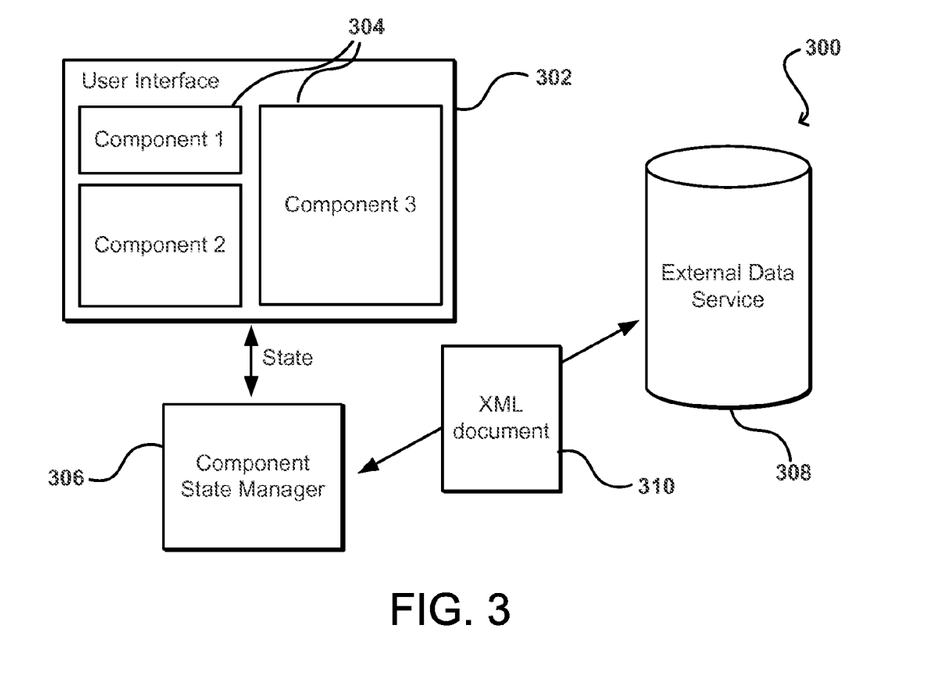
FIG. 3 illustrates a system configuration that can be used in accordance with one embodiment.

FIG. 3 illustrates an implementation overview 300 that can be used in accordance with one embodiment. As can be seen, the approach includes a user interface 302, such as a metadata editor in JSF, which includes a number of components 304 able to allow a user to view, select, or otherwise manage information available through the interface-generating application. These components can include, for example, text boxes, Ajax boxes, multi-select elements, check boxes, drop down menus, etc. In addition to the UI application, the approach includes a component state manager 306, such as may include a Java class, with which the components 304 of the UI application are able to register. Each component is able to register as a separate entity for a particular page. By enabling the UI components to register with the component state manager 306, the component state manager is able to obtain appropriate state information (e.g., visual state, contextual state, selected state, etc.) for each registered component on a page at any time, such as in response to a user request. The component state manager 306 then can store that state information for subsequent retrieval. The state information can be stored to any appropriate data store as known or used in the art. In one embodiment, the state information is stored to an external data service 308 that allows any data to be stored and retrieved using any appropriate naming convention. An external data service can include any remote data service, data source, and/or data store that is accessible over a network, such as the Internet, and is able to store data, retrieve, and otherwise manage data as a service. An application in one embodiment is able to subscribe to the external data service in order to store application data remotely, which also provides the advantage that the operator of the application does not have to manage the data or the hardware and software necessary to store and manage the data locally. Another advantage to using an external data service is that the information can be accessed from any appropriate location by using the identifier. Further, the identifier does not expose information about the state information or the data store that could allow for unauthorized access to the stored state information. It should be understood, however, that data can also be stored locally in other embodiments as would be apparent to one of ordinary skill in the art in light of the teachings and suggestions contained herein.

In one embodiment, the state information for each registered component is written to an extensible markup language (XML) document 310, which is then stored to the external data service 308. Using XML is advantageous because it is a very flexible yet standardized and structured approach to storing any type of data. XML allows the application to be very extensible, and since XML is internationalized the character streams can be in any character set. Although other formats can be used, the components, names, and state fit well into the hierarchical XML structure in at least some applications.

Figure 4A:
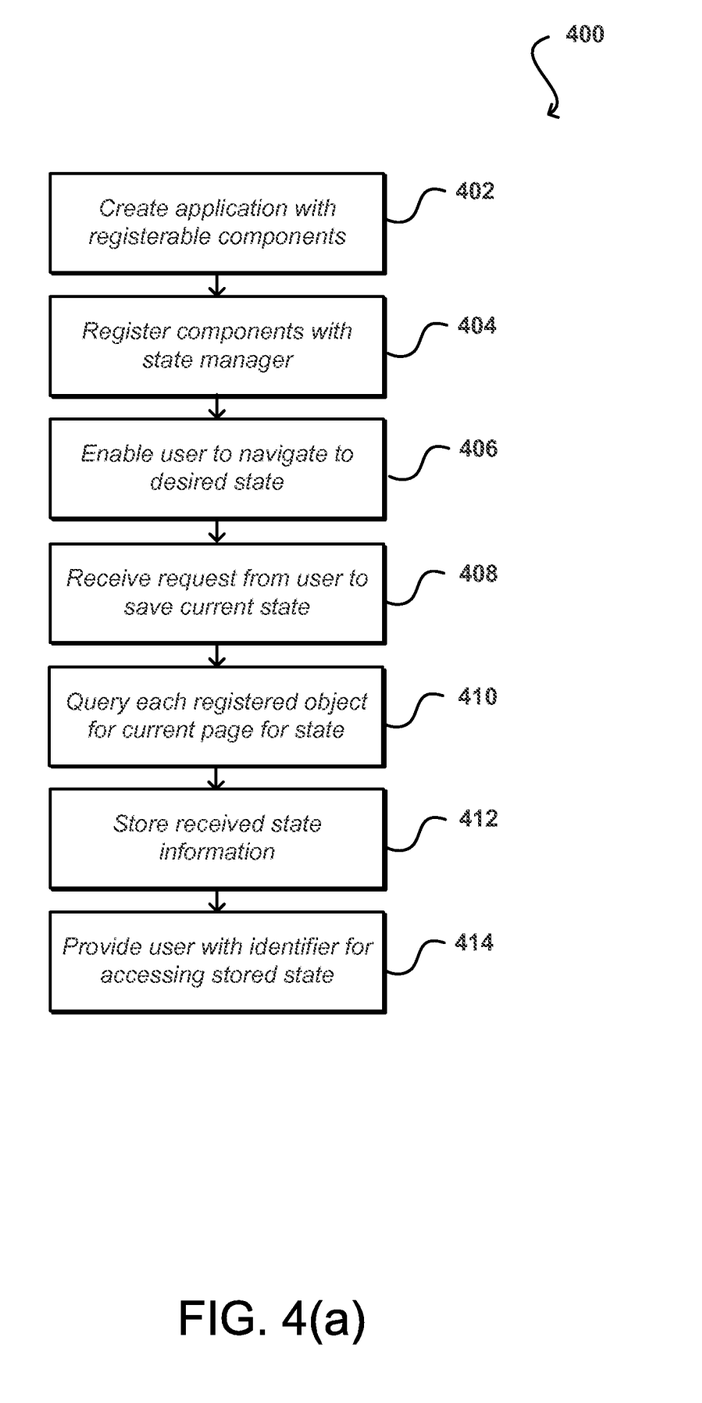
FIGS. 4(a) and 4(b) illustrate steps that can be used to save and retrieve state information for a page in accordance with one embodiment.

FIG. 4(a) illustrates steps of one example process 400 for storing state information in accordance with one embodiment. In this example, an application is created which contains a UI with components able to allow a user to view, select, and/or otherwise access data 402. These components are registered with a component state manager 404. A user of the application utilizes the components to navigate to a particular state corresponding to the desired information 406. At any time when the user navigates to a selection of data that is desirable to be saved for any reason, the user is able to request that the data selection be saved 408. In response to the request, the component state manager is able to query state information from each registered component on the page 410. The state information is then stored for subsequent retrieval 412. The user is provided with means for accessing the stored state information 414, such as a link or identifier that can be used to retrieve the stored state information. As discussed above, this can include writing the data to an XML document or other structured object for storage and subsequent retrieval.

Figure 4B:
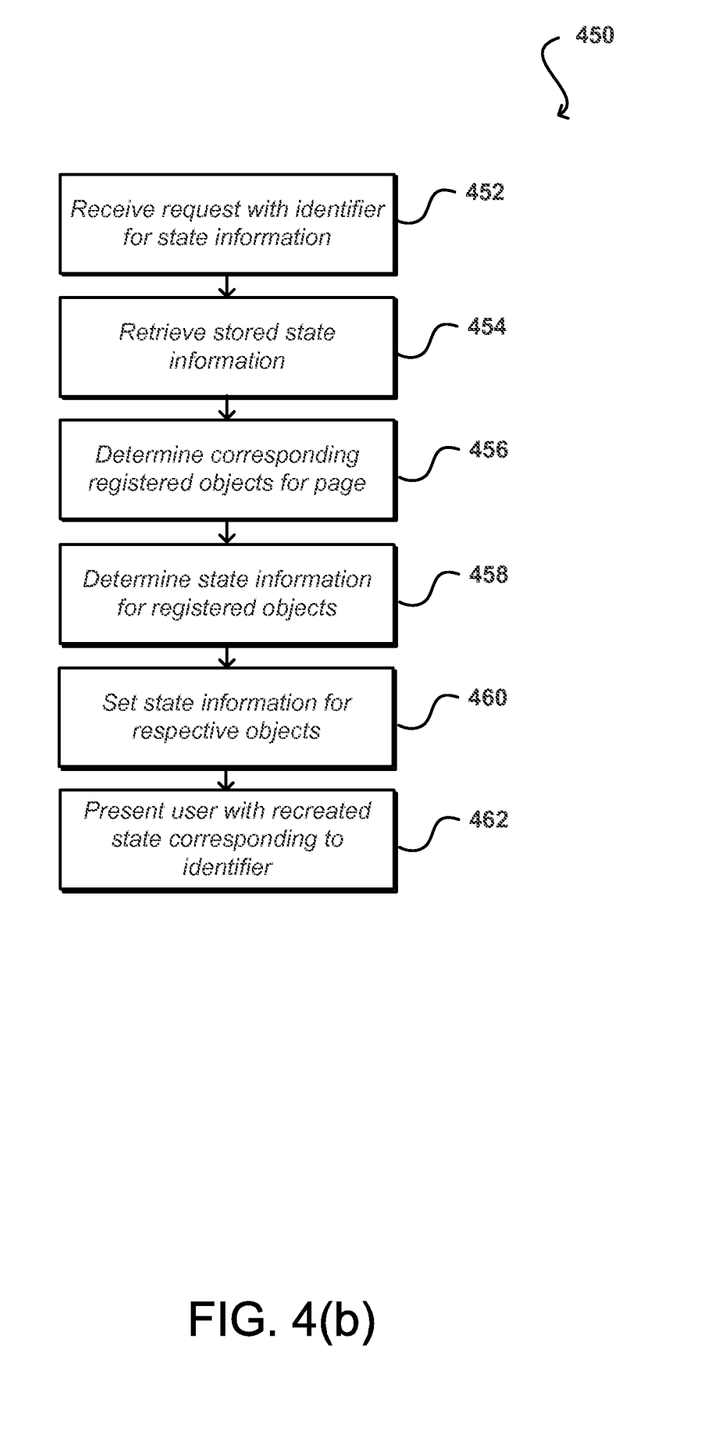

FIG. 4(b) illustrate steps of an example process 450 for retrieving the stored state information in accordance with one embodiment. In this example, the user submits a request including the identifier for the stored state information 452. In one example, where the application is displayed through a browser or similar application, the user can simply select or enter the link that corresponds to the stored state information. In other embodiments, the user can be required to first open or otherwise access the application, then select or enter the identifier as discussed elsewhere herein. In response to the request, the component manager retrieves the stored state information 454. As discussed above this can involve retrieving an XML document from an external data service, for example. The component state manager can determine which objects on the respective page are registered with the manager and able to provide, or have set, state information 456. For each registered component on the page, the component state manager determines whether state information was stored 458. Where information was stored, the component state manager sets the appropriate state information for the registered component(s) 460. In the case of XML, the XML can be broken apart or parsed to determine the appropriate state data and object information. When the states of all the registered components are set, the user is presented with selections in the application that correspond to the selections set by the user 462. As discussed above, the link or identifier can be shared such that the user retrieving the state information may not be the same user who initially saved the information.

Figure 5:
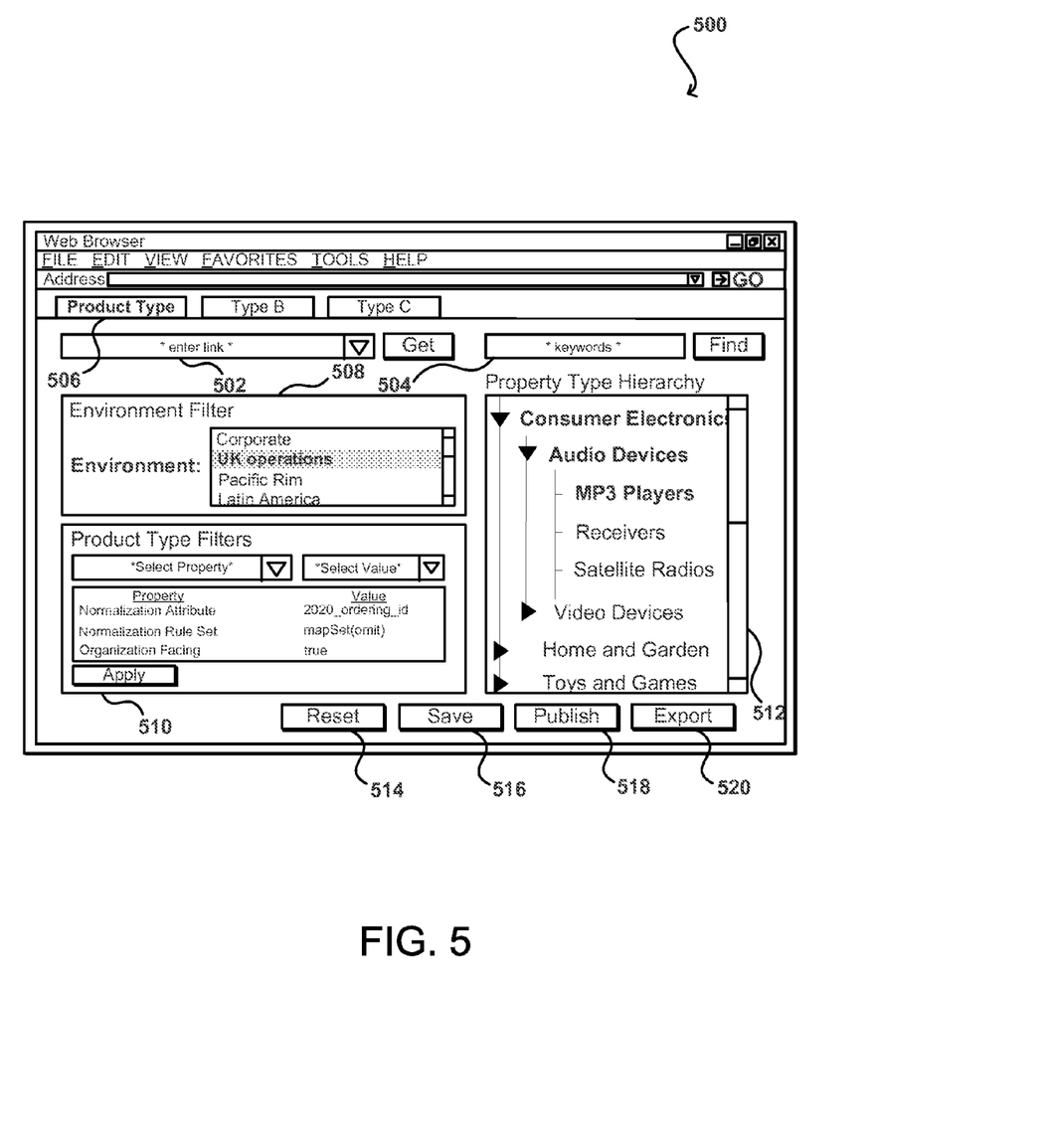
FIG. 5 illustrates a page showing restored product type information that can be used in accordance with one embodiment.

FIG. 5 shows an example page 500 that can be displayed in response to retrieving stored state information according to a process such as that described with respect to FIG. 4(b). In this page, the user is able to enter a link, tag, or other identifier, corresponding to saved state information, into a text box 502, an AJAX box allowing for any type of text matching based on the AJAX auto completion, or a similar user-accessible element. As shown, the text box can be configured as a drop-down menu or other selectable element allowing a user to select recent links or state identifiers. Other elements, such as "history," "bookmark," or "recent" elements, can be used to find these identifiers as well. If the user does not know the link or identifier, the user can instead search for a link or identifier using a search function 504. In some embodiments, a user is able to search for state information by entering keywords, such as property types, which the application or component state manager, for example, can use to search the saved data and present corresponding results. In other embodiments, a user can enter a portion of a state identifier to retrieve matching identifiers. For example, a user can create an identifier that includes that user's name or another string that is used by that user with every saved state such that the user is easily able to retrieve any state information saved by that user. Various other ways of saving, identifying, and retrieving data would be apparent to one of ordinary skill in the art in light of the teachings and suggestions contained herein, and will not be discussed herein in detail.

Once the user has selected a link or identifier using one of the aforementioned approaches, the corresponding state information is retrieved. The example page of FIG. 5 includes at least four components that can be registered with the component state manager, including a data type tab navigation component 506, an environment filter component 508, a product type filter component 510, and a product type hierarchy component 512. Various combinations of these and/or other components can be used as well within the scope of this disclosure. When a user first accesses the page, there may be no information selected, or default information selected, for each component. In response to submitting a state identifier, however, the component state manager will retrieve the state information, determine the corresponding registered components on the page, and work with the UI application to display the corresponding state for each. As shown in this example, by submitting a state identifier, the UI displays "Product Type" data for UK operations for MP3 players, and is has selected or otherwise specified various product type filters to obtain information for MP3 players in the UK. Here, the user was able to navigate back to this state by simply selecting the appropriate state identifier, without the tedious process of navigating back to this state and selecting all the desired options. When the user has the state information restored, the user can select an option 518 to publish the corresponding information, or an option 520 to export the corresponding information, useful when the same report has to be re-run periodically using the same data types. The user can also select an option 514 to reset the state, doing away with the restored selections in the displayed interface, or to modify the state of at least one of the components and then select an option 516 to save the modified state using a new identifier (or overwriting the previous identifier). Various known methods can be used for extracting, publishing, and overwriting data and will not be discussed in detail herein. Other options can also exist, such as to make the state information private or to store the state information locally so that the state information is not available to other and/or external users. Storing the state information to an external data service also allows for sharing state information across various stages, such as beta, production, and development versions, all using the same data. Such an approach can be used to store any appropriate information, including but not limited to metadata as described herein.

When saving state information, an approach in accordance with one embodiment causes a pop-up dialog to be generated which is able to capture an identifying name, description, keywords, date, or other such information about the state. The component state manager then creates and stores a corresponding data object (such as an XML document) in a bucket for GUI filters. Subsequently, any authorized user can locate and access this and other shared applicable filters via, for example, an Ajax-enabled widget. Users can enter text fragments to find a suitable filter by any of the metadata entries, including date of creation. The application can forward the selected data object to all of the page's registered components (e.g., each UI component, as backed by a Java bean), which then is able to finds an applicable section, decode the state information, and set the corresponding UI.

FIG. 6 shows an example of one such XML document 600 that can be generated and saved for a particular state in accordance with one embodiment. As discussed, product or item type information typically is stored in a hierarchy, where items such as audio devices are stored under a consumer electronics type, and MP3 players are stored under the audio devices type. As used herein, the term "item" can refer to anything that can be ordered, purchased, rented, used, or otherwise consumed and/or accessed via a network request or electronic submission, such as a product, service, or system. If a user just wants information about MP3 players specific to the UK marketplace, for example, the XML document could store values for the appropriate filters that allow the application to readily recreate the state for MP3 players in the UK without having to navigate back through consumer electronics, for example. In the example of FIG. 6, it can be seen that a number of product type selection filter values were selected for a specific organization filter and property filter. Due to the large number of selections that would otherwise have to be made for this state, a significant amount of time can be saved by utilizing the state information stored in this XML document. Further, when the application utilizes a technology such as JSF, all of the internal interactions that the controller is using to manipulate the model and present the view can all be done internally with information tracking. Further, an advantage over approaches that commit all state directly to the database or within the program itself is that this approach is more flexible and extensible and does not commit any changes to a database, such that new operations can be performed using any state of the data. Other technologies, such as PHP, could be used as well.

Components in various embodiments are able to register with the component state manager regardless of the appearance or functionality of the UI. In the case where the manager is a Java class, there can be a defined interface for the class that allows a UI component to register. When it is desired to implement the save state mechanism for an application, the UI components in one embodiment are designed to follow or implement this interface, which allows those components to register and also to be set by this class. The class is able to connect to the external data service or other data source or store, and is able to identity connections, stages, identifiers, accounts, and other such information used to access the desired data. Registering of the components in at least one embodiment occurs at design time. A developer can bring in the class and make an instance of the UI component that is written to adhere to the Java interface requirements. Once that component is registered, a method is added for saving the state information such that the registered component can divulge the current state. When the registered components are then queried for state information, the registered components pass back their current state. In other embodiments, the component state manager is able to locate any appropriate object in the interface at run time and retrieve or set state information.

In one embodiment, the component state manager is provided as a service to which components of a page can subscribe. The service can be provided remotely, and can allow any authorized application to have state information stored and retrieved as discussed herein.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, or keypad), and at least one output device a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer—readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of managing state information for an application utilizing a graphical user interface, comprising:
    under control of one or more computer systems configured with executable instructions,
        providing a component interface specified with an object-oriented computer programming language for at least one of a plurality of components of a user interface of an application, individual components having a state able to be altered by a user, the component interface including:
            a first interface element that, in response to a request, at least provides a current state of the component; and
            a second interface element that, in response to a request, at least sets the current state of the component to a provided state;
        providing a state manager interface specified with the object-oriented computer programming language for a component state manager, the state manager interface distinct from the component interface and including:
            a third interface element that, in response to a request, at least registers one or more of the plurality of components of the user interface;
            a fourth interface element that, in response to a request, at least saves state information for the user interface of the application and generates, by the component state manager and independent of a textual user input, an identifier corresponding to the saved state information, the state information for the user interface obtained at least in part with the first interface element of the component interface for one or more registered components of the user interface;
            a fifth interface element that, in response to a request, at least provides for presentation a plurality of identifiers associated with user input that corresponds to at least a portion of the identifier generated by the fourth interface element; and
            a sixth interface element that, in response to a request, at least restores saved state information for the user interface of the application at least in part by setting the current state of one or more registered components of the user interface with the second interface element, the saved state information for the user interface being identified by the identifier generated by the fourth interface element; and
        responsive to a request by the user, restoring the state of the at least one of the plurality of components of the user interface with the component state manager.

2. A method in accordance with claim 1, wherein individual components of the plurality of components of the user interface registered by the component state manager implement the component interface.

3. A method in accordance with claim 1, wherein the plurality of components of the user interface are maintained at a network location that is remote from the component state manager.

4. A method in accordance with claim 1, wherein a component of the user interface is enabled to register using the third interface element of the state manager interface at least in part by implementing the component interface.

5. A method in accordance with claim 1, wherein providing the current state of the component by the first interface element comprises providing a data object specified with an extensible markup language.

6. A method in accordance with claim 1, wherein saving state information for the user interface by the fourth interface element comprises saving one or more data objects obtained using the component interface in a data store.

7. A method in accordance with claim 6, wherein the identifier provided by the fourth interface element corresponds to the one or more data objects saved in the data store.

8. A method in accordance with claim 1, wherein the plurality of identifiers includes the identifier generated by the fourth interface element and a second identifier corresponding to saved state information associated with a second user.

9. A system for managing state information, comprising:
    memory storing computer-executable instructions; and
    at least one processor configured to access the memory and execute the computer-executable instructions to at least facilitate:
        a user interface of an application, the user interface having a plurality of components, wherein individual components of the plurality of components have a state able to be altered by a user;
        a component interface implemented by at least one of the plurality of components registered by a component state manager, the component interface including:
            a first interface element that, in response to a request, at least provides a current state of the component; and
            a second interface element that, in response to a request, at least sets the current state of the component to a provided state; and
        the component state manager having a state manager interface that is distinct from the component interface and including:
            a third interface element that, in response to a request, at least registers one or more of the plurality of components of the user interface;
            a fourth interface element that, in response to a request, at least saves state information for the user interface of the application and generates, by the component state manager and independent of a textual user input, an identifier corresponding to the saved state information, the state information for the user interface obtained at least in part with the first interface element of the component interface for one or more registered components of the user interface;

a fifth interface element that, in response to a request, at least provides for presentation a plurality of identifiers associated with user input that corresponds to at least a portion of the identifier generated by the fourth interface element; and a sixth interface element that, in response to a request, at least restores saved state information for the user interface of the application at least in part by setting the current state of one or more registered components of the user interface with the second interface element, the saved state information for the user interface being identified by the identifier generated by the fourth interface element.

10. A system in accordance with claim 9, wherein the user interface includes a graphical user interface and the plurality of components of the user interface include a plurality of graphical user interface components.

11. A system in accordance with claim 10, wherein the state of at least one of the plurality of graphical user interface components corresponds to an appearance of the graphical user interface component to the user and restoring the state of the graphical user interface component restores the appearance.

12. A system in accordance with claim 10, wherein the graphical user interface is configured to, at least:

enable the user input that corresponds to the at least a portion of the identifier provided by the fifth interface element; and provide the plurality of identifiers for presentation to the user.

13. A system in accordance with claim 10, wherein the graphical user interface is configured to, at least:

receive a selection of one of the plurality of identifiers that are provided by the fifth interface element; and responsive to the selection, restore the state of the at least one of the plurality of components of the user interface with the sixth interface element.

14. A system in accordance with claim 9, further comprising a graphical user interface for the component state manager, the graphical user interface configured at least to activate one or more of the third interface element, the fourth interface element, the fifth interface element and the sixth interface element responsive to user interaction with the graphical user interface.

15. At least one non-transitory computer-readable medium having collectively stored thereon computer-executable instructions that, when executed by at least one processor, cause at least one computer to collectively, at least:

provide a component interface specified with an object-oriented computer programming language for at least one of a plurality of components of a user interface of an application, wherein individual components have a state able to be altered by a user and the component interface includes:

a first interface element that, in response to a request, at least provides a current state of the component; and a second interface element that, in response to a request, at least sets the current state of the component to a provided state;

provide a state manager interface specified with the object-oriented computer programming language for a component state manager, the state manager interface distinct from the component interface and including:

a third interface element that, in response to a request, at least registers one or more of the plurality of components of the user interface;

a fourth interface element that, in response to a request, at least saves state information for the user interface of the application and generates, by the component state manager and independent of a textual user input, an identifier corresponding to the saved state information, the state information for the user interface obtained at least in part with the first interface element of the component interface for one or more registered components of the user interface;

a fifth interface element that, in response to a request, at least provides for presentation a plurality of identifiers associated with user input that corresponds to at least a portion of the identifier generated by the fourth interface element; and a sixth interface element that, in response to a request, at least restores saved state information for the user interface of the application at least in part by setting the current state of one or more registered components of the user interface with the second interface element, the saved state information for the user interface being identified by an identifier provided by the fourth interface element; and responsive to a request by the user, restore the state of the at least one of the plurality of components of the user interface with the component state manager.

16. At least one computer-readable medium in accordance with claim 15, wherein the state of the component includes at least one of: visual state, contextual state and selected state.

17. At least one computer-readable medium in accordance with claim 15, wherein the application includes a metadata editor.

18. At least one computer-readable medium in accordance with claim 15, wherein the at least one of the plurality of components of the user interface is associated with a navigation hierarchy and the state of the component includes a selected node in the navigation hierarchy.

19. At least one computer-readable medium in accordance with claim 15, wherein the identifier corresponding to the saved state information does not expose information about the saved state information that could enable unauthorized access to the saved state information.

20. At least one computer-readable medium in accordance with claim 15, wherein the at least one of the plurality of components of the user interface participates in a model-view-controller component architecture.

* * * * *